US009064109B2

(12) United States Patent
Smith et al.

(10) Patent No.: US 9,064,109 B2
(45) Date of Patent: Jun. 23, 2015

(54) PRIVACY ENHANCED KEY MANAGEMENT FOR A WEB SERVICE PROVIDER USING A CONVERGED SECURITY ENGINE

(71) Applicant: Intel Corporation, Santa Clara, CA (US)

(72) Inventors: Ned M. Smith, Beaverton, OR (US); Conor P. Cahill, Waterford, VA (US); Victoria C. Moore, Phoenix, AZ (US); Jason Martin, Beaverton, OR (US); Micah J. Sheller, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 13/721,760

(22) Filed: Dec. 20, 2012

(65) Prior Publication Data

US 2014/0181925 A1 Jun. 26, 2014

(51) Int. Cl.
*G06F 17/30* (2006.01)
*G06F 21/45* (2013.01)
*G06F 21/31* (2013.01)
*G06F 21/33* (2013.01)
*H04L 29/06* (2006.01)

(52) U.S. Cl.
CPC .............. *G06F 21/45* (2013.01); *G06F 21/31* (2013.01); *G06F 21/33* (2013.01); *H04L 63/0815* (2013.01); *H04L 2463/082* (2013.01)

(58) Field of Classification Search
CPC ....... H04L 63/08; H04L 29/06; H04L 63/062; H04L 63/0823; H04L 9/083; H04L 63/0815; H04L 2463/082; G06F 21/45; G06F 21/33
USPC .......................................................... 726/6
See application file for complete search history.

(56) References Cited

U.S. PATENT DOCUMENTS

2006/0015717 A1 1/2006 Liu et al.
2008/0123862 A1* 5/2008 Rowley ......................... 380/279
2008/0126779 A1 5/2008 Smith (Continued)

FOREIGN PATENT DOCUMENTS

EP 2194476 6/2010

OTHER PUBLICATIONS

U.S. Appl. No. 13/530,773, filed Jun. 22, 2012, entitled "Providing Geographic Protection to a System," by Ned M. Smith.
U.S. Appl. No. 13/531,878, filed Jun. 25, 2012, entitled "Authenticating a User of a System Via an Authentication Image Mechanism," by Ned M. Smith.
Intel, "Intel Trusted Execution Technology (Intel TXT), Software Development Guide, Measured Launched Environment Developers Guide," Mar. 2011, 112 pages.

(Continued)

*Primary Examiner* — Dant Shaifer Harriman
*Assistant Examiner* — Abiy Getachew
(74) *Attorney, Agent, or Firm* — Trop, Pruner & Hu, P.C.

(57) ABSTRACT

In an embodiment, a security engine of a processor includes an identity provider logic to generate a first key pair of a key pairing associating system user and a service provider that provides a web service and having a second system coupled to the system via a network, to perform a secure communication with the second system to enable the second system to verify that the identity provider logic is executing in a trusted execution environment, and responsive to the verification, to send a first key of the first key pair to the second system. This key may enable the second system to verify an assertion communicated by the identity provider logic that the user has been authenticated to the system according to a multi-factor authentication. Other embodiments are described and claimed.

20 Claims, 4 Drawing Sheets

(56) References Cited

U.S. PATENT DOCUMENTS

| | | |
|---|---|---|
| 2008/0130879 A1 | 6/2008 | Heinonen et al. |
| 2008/0244292 A1 | 10/2008 | Kumar et al. |
| 2009/0132837 A1 | 5/2009 | Kumar |
| 2009/0172438 A1 | 7/2009 | Kumar |
| 2010/0023865 A1* | 1/2010 | Fulker et al. ............ 715/734 |
| 2010/0082987 A1 | 4/2010 | Thom et al. |
| 2010/0310077 A1 | 12/2010 | Sun et al. |
| 2011/0145598 A1 | 6/2011 | Smith |
| 2011/0246817 A1* | 10/2011 | Orsini et al. ............ 714/6.1 |
| 2012/0030730 A1 | 2/2012 | Smith et al. |
| 2013/0013931 A1* | 1/2013 | O'Hare et al. ............ 713/189 |

OTHER PUBLICATIONS

Intel, "Trusted Execution Technology Architectural Overview," 2003, 8 pages.

Intel, White Paper, "Trusted Execution Technology, Hardware-based Technology for Enhancing Server Platform Security," 2010, 8 pages.

International Patent Application No. PCT/US11/67573 filed Dec. 28, 2011, entitled "Method and Apparatus to Determined User Presence," by Victoria C. Moore.

International Searching Authority, "Notification of Transmittal of the International Search Report and the Written Opinion of the International Searching Authority," mailed Apr. 7, 2014, in International application No. PCT/US2013/072911.

* cited by examiner

PRIVACY ENHANCED KEY MANAGEMENT FOR A WEB SERVICE PROVIDER USING A CONVERGED SECURITY ENGINE

BACKGROUND

Computer users interact with 10's and even 100's of Internet-based web service providers on a routine basis due to the explosion of the Internet and web-based interactions. Each service provider wishes to maintain a subscriber base in order to maintain close access to his or her customers. Consequently, users are expected to manage 10's and even 100's of accounts and corresponding usernames and passwords. Users often misuse password credentials (e.g., use weak passwords, and reuse passwords and usernames) to easily access web-based services. Several problems can occur including cross-site account hacks, service provider collusion and tracking of user transactions. These attacks result in a user losing control of their information, real world assets, damaged reputation and even job loss.

User studies show that password management is a major usability challenge and is a contributing factor to web account mismanagement. Current solutions rely on user account creation protocols that involve the user creating a password and providing a series of password reset challenge questions (e.g., favorite pet). These mechanisms are weak because many times the challenge information is public and/or can be easily inferred. Another approach integrates public key infrastructure (PKI) into the website and client. However, the user client must purchase a client X.509 certificate for use with each service provider, which is cost prohibitive for most users. Similarly, use of a one-time-password (OTP) device that authenticates the user to a particular service provider is cost prohibitive for discrete OTP devices. Software OTP devices may be used to reduce cost, but each service provider must support the particular OTP implementation, and in any event the OTP device can only be used for authentication and cannot be used to encrypt or sign data.

DETAILED DESCRIPTION

Figure 1:
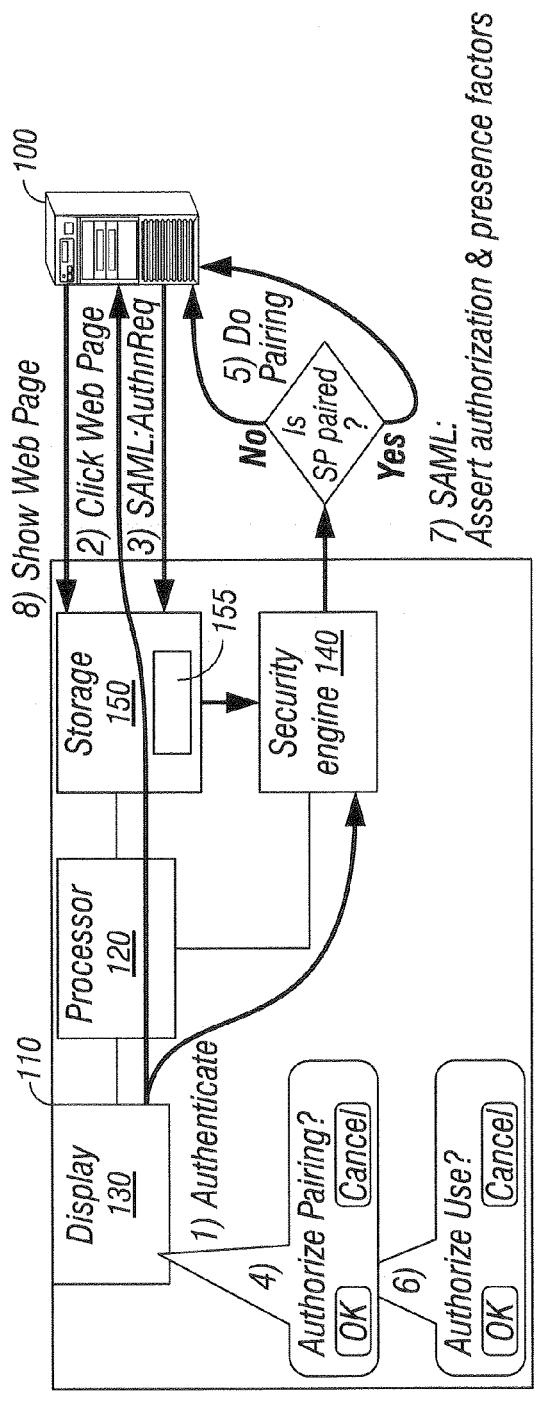
FIG. 1 is a block diagram of a system illustrating communications between various components in accordance with an embodiment of the present invention.

In various embodiments, an identity provider (IdP) logic may be embedded in a security engine that provides a trusted execution environment (TEE) within a semiconductor device such as a processor, chipset or so forth. This security engine is referred to herein as a converged security engine (CSE). The IdP reports the user's authentication status using industry standard security assertion markup language (SAML) messages, in an embodiment. The CSE is used to protect sensitive user authentication data and user-service provider pairing keys. When the user browses a service provider web page, the service provider (SP) challenges the user to authenticate using a SAML redirection mechanism. This challenge is handled automatically in the system, without the need for user to directly perform a challenge-responsive interaction with the SP. The CSE hosting the IdP accepts the SAML challenge. This approach allows SPs to adopt SAML since the user will always have an IdP to which the challenge can be redirected. The CSE executing in the TEE also authenticates the user directly (rather than requiring the SP to perform this task). Processing authentication challenges locally allows much of the complexity of multi-factor authentication to be hidden from the SP, lowering barriers to adoption of password alternatives.

More specifically, embodiments may use a SAML message exchange to direct and orchestrate the dynamic creation of a user-SP key pairing that associates the user with the SP, where each SP is provided a different asymmetric or symmetric key that authenticates the user's (client's) subsequent access to the SP website. While analogous to the approach used to manage passwords, this pairing replaces passwords with strong cryptographic credentials. Note that although embodiments described herein are as to Internet network access to user accounts, website content and so forth, understand that the authentication processes are more generally applicable to access to any web service offered by the SP.

The user retains control of the relationship between the user and the SP using privacy controls that include opt-in approval to establish a pairing relationship, and further by using opt-in approval to use the pairing keys (e.g., to respond to a SP authentication challenge). Privacy is further enhanced by using an enhanced privacy identifier (EPID) key that is embedded in the client platform at manufacturing time to establish a pseudonymous secure channel at pairing. The pseudonymous identity reveals that the client TEE is authentic but does not reveal which specific platform is establishing the pairing. For this, the protocol enables the user to use a previously created account that the SP associates with the pairing. Embodiments may also support the use of a one-time password or an out-of-band mechanism to associate the pairing key to the user's account information (e.g., the SP sends the user a text or phone message with a personal identification number (PIN) that is returned using the pairing key).

Referring now to FIG. 1, shown is a block diagram of a system 100 illustrating communications between various components of the system. More specifically, system 100 is a network environment in which a client system 110 seeks to access information of a service provider 160, such as a web service provider that provides web-based information via a web page server or other system of the service provider. In different implementations, client system 110 may be any type of computing device used by a user such as a desktop computer, laptop computer, Ultrabook™, tablet computer, electronic reader, smartphone or other such device. In general, client system 110 includes various components including a processor 120 such as a central processing unit (CPU) including one or more processor cores and other engines, a display 130, CSE 140, and a storage 150 that is configured to store various applications, including a browser 155 such that the user can access web pages via the Internet. Of course although shown with this limited number of components for ease of illustration, a client system can include many other components.

Also illustrated in FIG. 1 are a number of communications occurring between components within client system 110 as well as between client system 110 and service provider 160. Although shown in a particular numerical order to illustrate the high level features of an embodiment, understand that not all of these communications are needed and further understand that different orders and different communications may occur. As an initial operation, a user may be requested to authenticate to the system upon system initialization. Note that many different types of authentication mechanisms may be provided and it is to be understood that some embodiments dictate that a multi-factor authentication process occur. Although the scope of the present invention is not limited in this regard such multi-factor authentication may include a plurality of different authentication mechanisms including user inputs via a keyboard, touchpad, touch screen or so forth, near field communication, wireless communication, and/or presence authentication to indicate that the user is present in a location of the system and is an authorized user. Still other authentication mechanisms can include other biometric features such as by way of retina scan, fingerprint or other biometric-based identification mechanisms. Note that various sensors of the system can be used for purposes of authentication, including accelerometer-based authentication based on a user's carrying or accessing of the device, biometric sensing of key input force and/or speed, among many others. In general, sensors used in authentications may include a plurality of different authentication and presence monitoring mechanisms, including a plurality of biometric, proximity and conventional (e.g., password) sensors.

This user authentication may occur early on in a process of using the client system and can be independent of any access to a service provider. These authentication procedures may be performed at least in part using CSE 140, including an IdP logic as described herein. Although the scope of the present invention is not limited in this regard, CSE 140 may be executed within a TEE and may be implemented as firmware of a chipset component such as firmware of a manageability engine (ME) of the chipset that enables a trusted execution environment to be created and executed, e.g., by way of a virtualization technology. This firmware thus may execute on one or more processing engines of the system including an engine of the chipset such as a ME and/or an engine such as a general-purpose core of a CPU of the client system.

FIG. 1 further shows a high level view of the operations performed in authenticating a user for access to a website. As seen, this process begins when a user seeks to access a web page via browser 155. Responsive to this request for access, service provider 160 communicates an authentication request, which in an embodiment may be a SAML request. Prior to performing this authentication process, the user may be prompted to indicate whether pairing via cryptographic keys between the client system and the service provider is authorized. In an embodiment, this request for authorization can be via a trusted path between processor 120 and display 130 such that this path is hidden even to a malware entity executing on client system 110. Thus in various embodiments, this display frame image seeking user approval, while viewable by a user of the platform, cannot be accessed by untrusted software including an operating system (OS) and applications (potentially including a malware application) executing on the platform. In one embodiment, the display frame image may be generated using a trusted display technology. In this way, the host software and OS are not able to decipher the contents of that frame, and instead it is provided via a trusted output path from the trusted engine to an (e.g., integrated) graphics display processor.

If the user approval is provided, it is next determined whether a pairing of cryptographic keys already exists between the user and service provider. If not, this pairing may be created, e.g., using Sign-and-mac (Sigma) protocol, details of which will be described further below. Next, another approval can be sought from the user to determine whether use of private pairing key information is to be allowed. Assuming so, a communication is then sent from CSE 140 to service provider 160, e.g., via a SAML mechanism to provide an assertion that describes the authentication factors used in authenticating the user. Responsive to verification of this response by service provider 160, access to the requested web page may be provided. Accordingly, browser 155 may operate to enable display of the web page and/or requested data to the user via display 130. Although shown at this high level in the embodiment of FIG. 1, understand the scope of the present invention is not limited in this regard.

Figure 2:
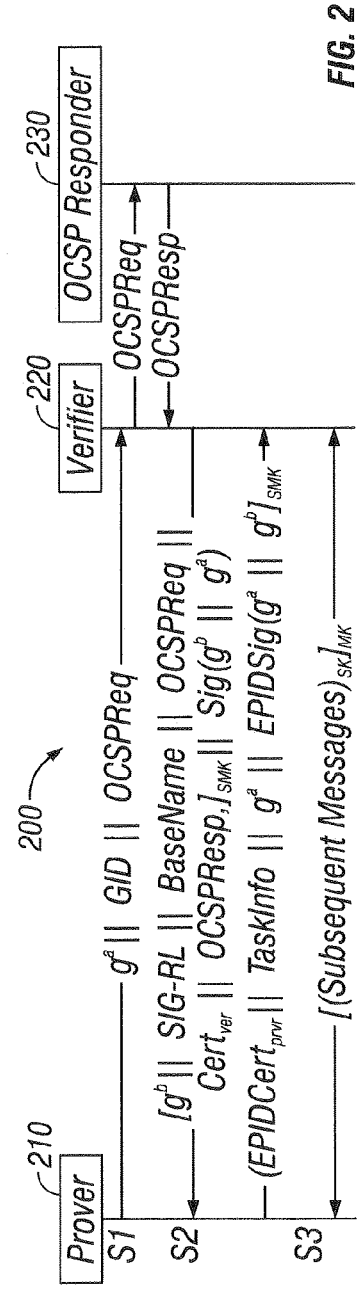
FIG. 2 is a high level view of the communications occurring in a Sigma session in accordance with an embodiment of the present invention.

Next referring to FIG. 2, shown is a high level view of the communications occurring in a Sigma session in accordance with an embodiment of the present invention. As seen, a Sigma session 200 may occur between a prover 210 which in an embodiment may be the client system and a verifier 220 which in an embodiment may be a service provider that acts as a proxy to an online certificate status protocol (OCSP) responder 230, which in an embodiment may be a given certificate authority. As seen, a first message may be provided from prover 210 to verifier 220 to seek creation of a Sigma session. This request in turn causes an OCSP request from verifier 220 to responder 230 and a resulting response that in turn leads to a message from verifier 220 to prover 210, providing certain information regarding this response. In turn, prover 210 can communicate certificate information, which in an embodiment may be an EPID certificate for the prover along with an EPID signature that thus enables verifier 220 to verify the authenticity of prover 210. Accordingly, subsequent messages may be communicated in both directions to create a user-service provider pairing of keys. This key pairing may include respective pairs of public and private keys, with each of the client and service provider generating a key pair, and providing the other with the generated public key. The pairing may also include symmetric keys, for example as a result of a Sigma handshake or a transport layer security (TLS) handshake. Note the pairing relationship may have other attributes that are less strong, such as a password which can be used for representing legacy SPs who do not leverage non-username/password authentication.

Figure 3:
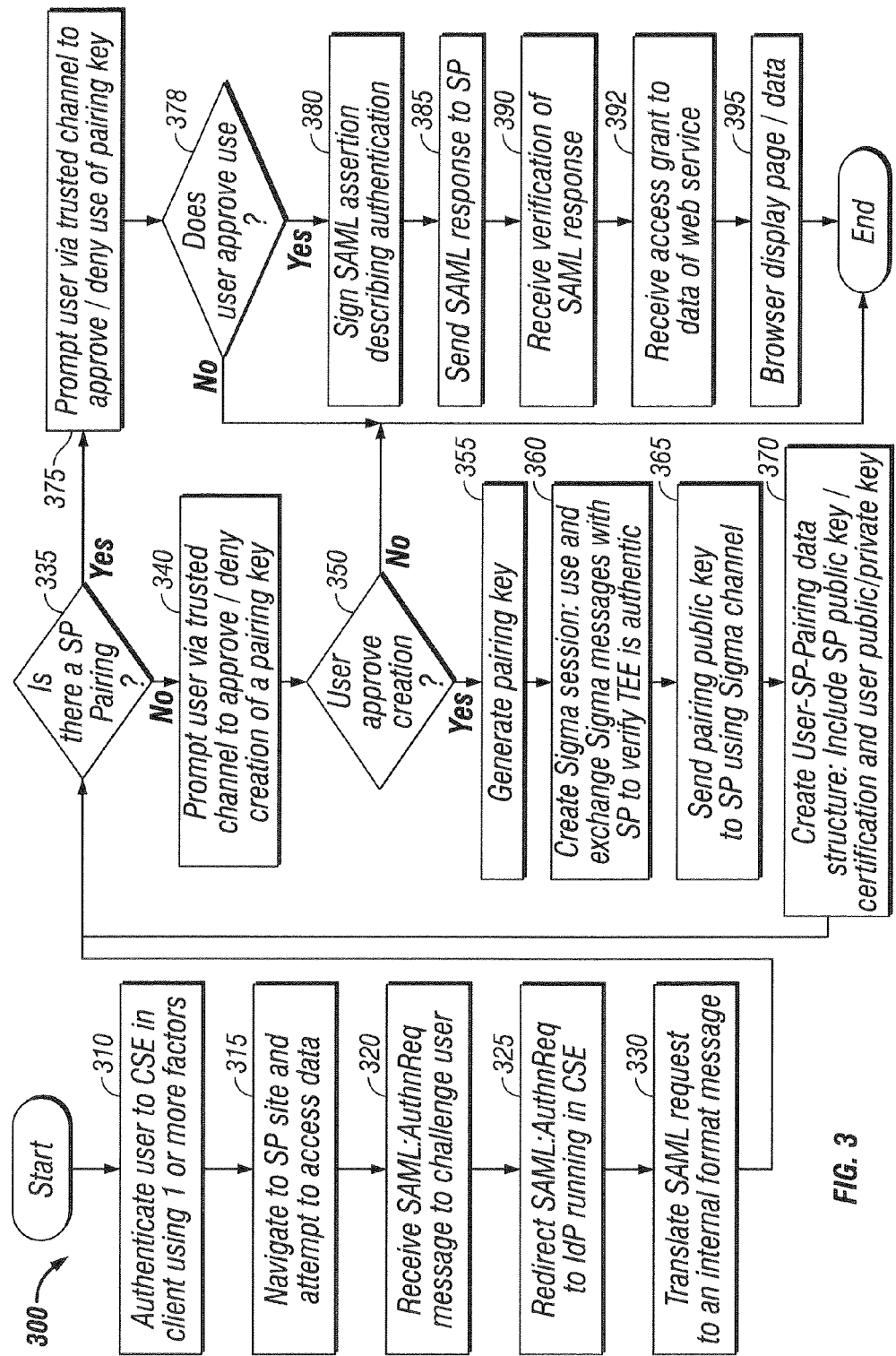
FIG. 3 is a flow diagram of a method for communicating in a secure manner with a web service provider in accordance with an embodiment of the present invention.

Referring now to FIG. 3, shown is a flow diagram of a method for communicating in a secure manner with a web service provider to enable creation of a user-service provider key pairing in the context of a browser session. As seen in FIG. 3, method 300 may be performed using various components both within a client system as well as components of a service provider system. Also understand that different flows are present in method 300, and not all operations may be performed in a given authentication process. As seen, method 300 begins at block 310 by authenticating a user to a CSE in the client system using one or more factors. As described above, this authentication may occur early on in a session with the client system such as a pre-boot environment and can be done independently of any future web browsing activities. Also as described above, various factors of a multi-factor authentication process can be performed.

Next control passes to block 315 where a user can navigate to a given service provider site and seek to access data. This access can be via a browser that executes on the client system. Note that for many websites such as for search engines, information sites and so forth, no further authentication is needed and instead direct navigating of the web page can occur. Rather embodiments described herein may be used in cases where a user seeks to communicate in a secure manner with a website such as for purposes of e-commerce, which is broadly used herein to mean any type of commercial activity over the Internet including purchases, financial transactions and so forth. Such e-commerce also may include enabling a user to log into an account of the user without a conventional username and password, instead using the user-SP pairing keys described herein.

Thus still referring to FIG. 3, control next passes to block 320 where an authentication request message is received from the service provider. In an embodiment this message is a SAML authentication request message to challenge the user to provide proof of authentication. Responsive to receipt of this message within the browser, the browser may redirect the request to an IdP logic executing within the CSE of the system. At block 330 this IdP logic may translate the SAML request to an internal format message. Although the scope of the present invention is not limited in this regard in an embodiment, this internal message format may include Java, C++, JavaScript or other computer programming language data structure representation. Control next passes to diamond 335 where it can be determined whether a pairing exists with this particular service provider. If so, control passes to block 375 discussed further below.

Otherwise if there is no pairing, control passes to block 340 where the user can be prompted, e.g., via a trusted channel to approve or deny creation of a pairing key. In an embodiment, this trusted path may be a non-spoofable secure channel between the CSE and a display that allows the user to receive a request message but prevent any other entity executing on the platform (including malware) from accessing this message as described above. Control next passes to diamond 350 to determine whether the user has approved creation of this pairing. In an embodiment, this approval can be received via a user input mechanism such as a mouse click, keyboard approval, or in another manner such as via a user gesture received by a gesture input device.

Assuming that the user approves creation, control passes to block 355 where a pairing key can be generated. In an embodiment an asymmetric or symmetric key generation process may be performed to generate this key. Next control passes to block 360 where a Sigma session can be created. In an embodiment this sigma session may be performed as discussed above with regard to FIG. 2. During this session, a Sigma message may be exchanged with the service provider to enable the service provider to verify that the client system is in an authenticated trusted execution environment. Next during this Sigma session the pairing public key may be sent to the service provider (block 365). Instead of sending the public key, a copy of the symmetric key can be sent. Note that using embodiments described herein, a separate private key and public key can be generated for each service provider with which a user seeks to access secure information and/or has an account. Also although not shown for ease of illustration understand that during this Sigma session the client system receives authentication information from the service provider, including a public key of the service provider and/or a certificate regarding authentication of the service provider.

With this information, a data structure can be created (block 370). For example, a record can be created and stored in an encrypted manner that describes the pairing relationship including, in an embodiment, the public and private keys generated by the client, as well as the public key received from the service provider, the service provider certificate and additional information such as Sigma session keys that can be used to retain/restore a Sigma session during website activities. That is, embodiments may provide for a Sigma session to occur while the website remains active according to some predetermined interval to ensure that the user remains authenticated and in a location of the client system.

Although not shown in FIG. 3, understand that similar operations to create and/or update a user record may occur on the service provider side. Particularly in situations where a user already has an account with the service provider that is accessed using a conventional username and password, this user record can be updated to modify the record to instead provide for authorization to occur in accordance with the key pair generated as described herein. As such, embodiments enable a legacy website account accessed using a conventional username and password to migrate to a website account accessed using a key pair mechanism. To this end, the service provider may further seek authorization from the user to update the user's record on the service provider side to eliminate a legacy username and password and migrate to the key pair-based authentication for purposes of interacting with the web service.

Still referring to FIG. 3, at this point an appropriate key pairing arrangement is established between the user and the service provider. Accordingly, when control passes back to diamond 335, determination is in the affirmative and accordingly, operation passes to block 375. The following operations relate to verifying the authenticated user to enable a web browsing session to occur. Specifically at block 375 the user may be prompted again via the trusted channel to approve use of the pairing key to enable the browsing session. Assuming that this user approval is received (at diamond 378), control passes to block 380 where an assertion can be generated that describes the authentication factors used to authenticate the user to the CSE. In an embodiment, this assertion may be a signed SAML assertion that describes the user multi-factor user assertion performed above at block 310. Note that no identification of the user is present in this assertion, nor is there any disclosure of biometric or other information of the user. Instead all that is described are the factors used in performing the authentication, rather than any particular user information associated with this authentication (other than that the user was in fact authenticated). Control next passes to block 385 where this SAML response can be sent to the service provider. Then at block 390 the service provider may verify the SAML response, and thereafter grant access to data and/or the web page subject to the verification (block 392), both of which are received by the client system so that the browser can display the web page and/or data (block 395). Although shown at this high level in the embodiment of FIG. 3, understand the scope of the present invention is not limited in this regard.

Figure 4:
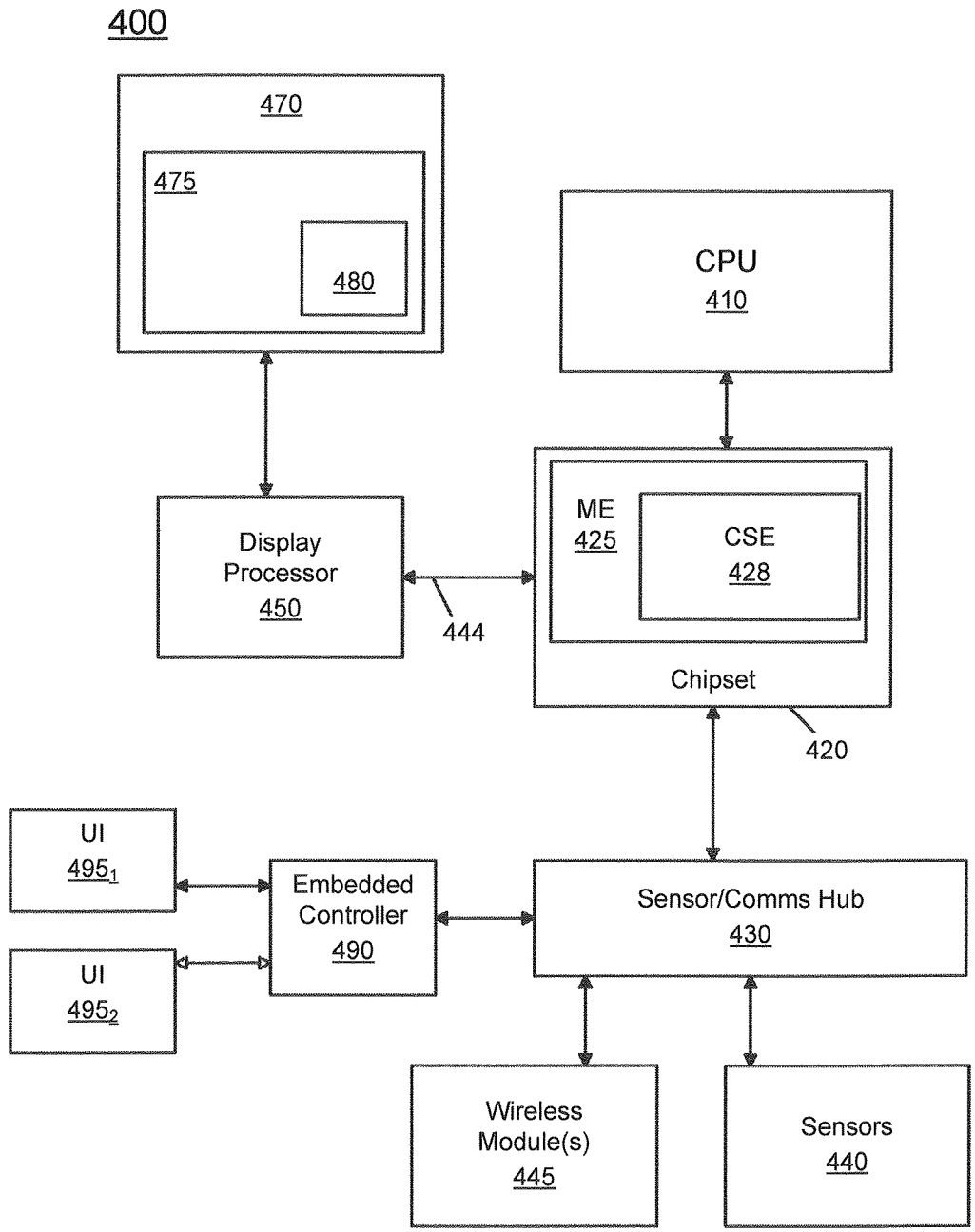
FIG. 4 is a block diagram of a system arrangement in accordance with an embodiment of the present invention

Referring now to FIG. 4, shown is a block diagram of a system arrangement in accordance with an embodiment of the present invention illustrating a launch execution process. As seen in FIG. 4, system 400 may include a CPU 410. In various embodiments, this CPU may be a system on a chip (SoC) or other multicore processor and can include secure execution technologies such as Intel® TXT™ technology, Intel® Manageability Engine (ME), or an ARM TrustZone to enable a trusted execution environment. This environment establishes a root of trust that evaluates the computing platform, including measuring platform components in the boot and launch environment (such as basic input/output system (BIOS), an OS loader, virtual machine manager, and other components). This root also provides a trusted position to evaluate the integrity of any other component. Once a basic root of trust and a secure basis for measurement and evaluation is established, other mechanisms can be used to seal and protect secrets in memory, as well as provide local or remote attestation of system configuration.

As seen in the embodiment of FIG. 4, CPU 410 may be coupled to a chipset 420. Although shown as separate components in the embodiment of FIG. 4, understand that in some implementations chipset 420 may be implemented within the same package as CPU 410, particularly when the CPU is implemented as an SoC. As seen, chipset 420 may include a manageability engine 425 including a CSE 428 which may include an IdP logic to perform multi-factor authentication of a user and key-based authentication with a service provider, as described herein. In an embodiment, the Sigma session can be performed using an EPID such that the client system can be authenticated yet still remain anonymous to the service provider.

Note that although CSE 428 is shown as being within an ME, understand that the scope of the present invention is not limited in this regard and the authentication and key pairing activities described herein can be performed in another location that also qualifies as a trusted execution environment. In an embodiment, CSE 428 may be implemented by an applet such as a Java™ applet that runs on a Java virtual machine (JVM) within firmware of the ME. Note however that a security engine used for authentication purposes described herein can be a generic engine that runs inside of a virtual machine or other virtualized environment running on another execution engine of the system.

In the embodiment of FIG. 4, additional components may be present including a sensor/communications hub 430 which may be a standalone hub or configured within chipset 420. As seen, one or more sensors 440 may be in communication with hub 430. As examples for purposes of illustration, the sensors may include a global positioning system (GPS) module or other such dedicated location sensor. Other sensors, such as inertial and environmental sensors may be present. As several examples, an accelerometer and a force detector may be provided and information obtained from these sensors can be used in biometric authentications. Also, in various embodiments one or more wireless communication modules 445 may also be present to enable communication with local or wide area wireless networks such as a given cellular system in accordance with a 3G or 4G/LTE communication protocol.

As further seen in FIG. 4, platform 400 may further include a display processor 450 that can be coupled to ME 425 via a secure channel 455 to prevent snooping of display frame images (including requests to the user to approve key pairing and authentication operations) as described herein. As seen, display processor 450 may couple to a display 470 that can be a touch screen display to receive user input such as responses to such requests. Thus in this example, configured within the display may be a touch screen 475 and a touch screen controller 480 (which of course is hidden behind the display itself). Note that the input channels from these components to ME 425 may be an untrusted channel. Similarly, other user interfaces, namely user interfaces $495_1$ and $495_2$ which in an example can be a keyboard and a mouse, may be coupled via an embedded controller 490 to the sensor/communications hub 430. Again this input path from these user interfaces may be via an untrusted channel.

Figure 5:
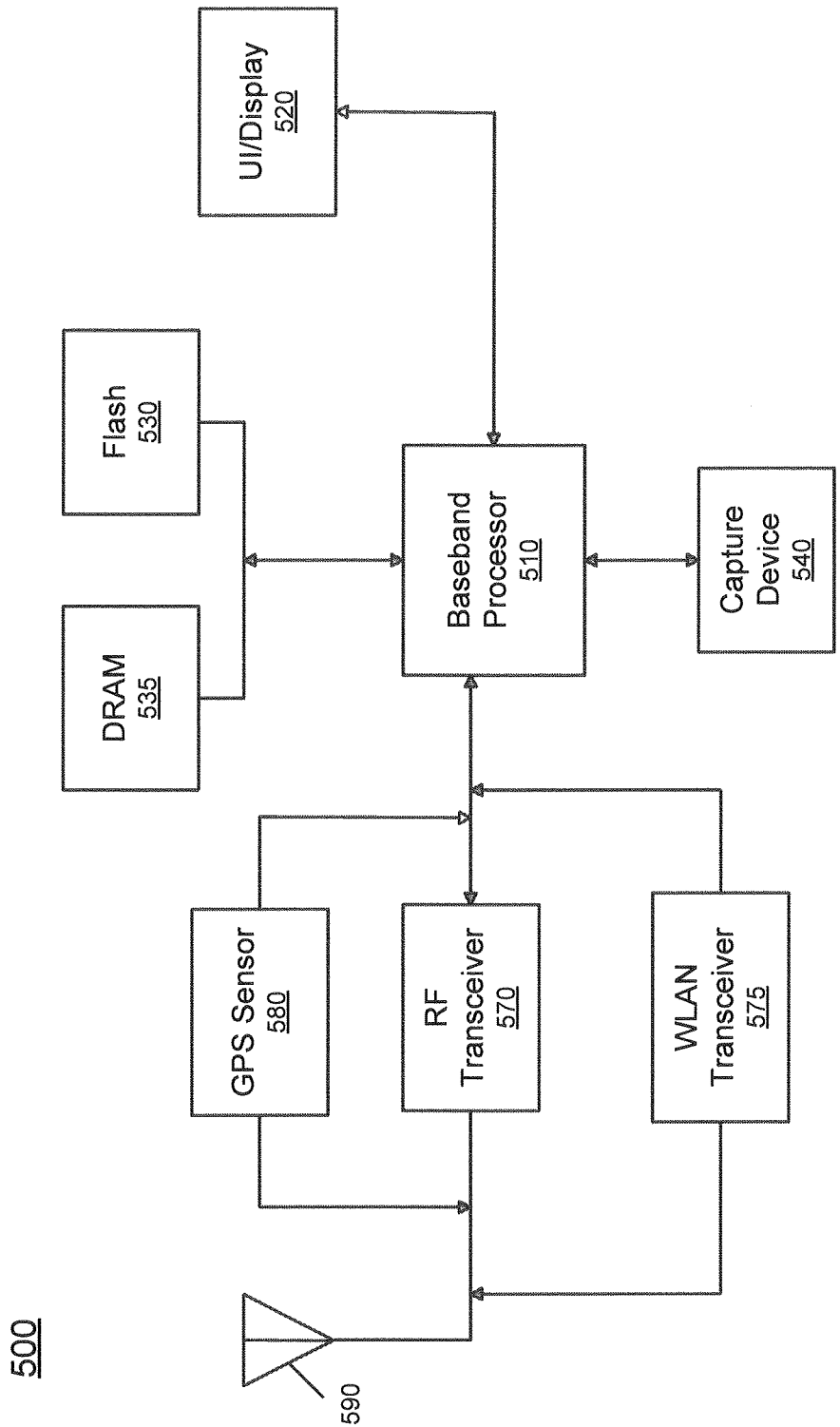
FIG. 5 is a block diagram of an example system with which embodiments can be used.

Embodiments can be used in many different environments. Referring now to FIG. 5, shown is a block diagram of an example system 500 with which embodiments can be used. As seen, system 500 may be a smartphone or other wireless communicator. As shown in the block diagram of FIG. 5, system 500 may include a baseband processor 510 which can include a security engine such as a manageability engine and other trusted hardware support to perform one or more user authentications, e.g., on boot up of the system, and further to perform key pairing operations and trust assertions with a remote service provider as described herein. In general, baseband processor 510 can perform various signal processing with regard to communications, as well as perform computing operations for the device. In turn, baseband processor 510 can couple to a user interface/display 520 which can be realized, in some embodiments by a touch screen display that can provide, via a service channel a request for user approval of key pairing operations. In addition, baseband processor 510 may couple to a memory system including, in the embodiment of FIG. 5 a non-volatile memory, namely a flash memory 530 and a system memory, namely a dynamic random access memory (DRAM) 535. As further seen, baseband processor 510 can couple to a capture device 540 such as an image capture device that can record video and/or still images.

To enable communications to be transmitted and received, various circuitry may be coupled between baseband processor 510 and an antenna 590. Specifically, a radio frequency (RF) transceiver 570 and a wireless local area network (WLAN) transceiver 575 may be present. In general, RF transceiver 570 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 580 may be present. Other wireless communications such as receipt or transmission of radio signals, e.g., AM/FM and other signals may also be provided. In addition, via WLAN transceiver 575, local wireless signals, such as according to a Bluetooth™ standard or an IEEE 802.11 standard such as IEEE 802.11a/b/g/n can also be realized. Although shown at this high level in the embodiment of FIG. 5, understand the scope of the present invention is not limited in this regard.

Embodiments may thus use key cryptography to authenticate a TEE running an IdP workload to a SP or secondary IdP. These authentication assertions contain a representation of multiple factors of authentication, where the actual authentication is performed by the client TEE, rather than by a service provider or third party authority.

Thus in various embodiments, user authentication for a web service may be performed at the client using a TEE that hides the complexity of a multiple factor authentication. In an embodiment, cryptographic keys (symmetric or asymmetric) may be used to authenticate the user to a SP. Specifically, a different key may be used for each SP (e.g., established as a pairing relationship) to ensure that a man-in-the-middle (MITM) attacker cannot correlate transactions. Further, use of an EPID key during initial setup prevents collusion among multiple SPs to share transaction details. And by using a TEE to perform user authentication with multiple factors of authentication, the complexity of authentication is hidden from the SP, making it easier for a SP backend to provide broad based support for strong authentication. Embodiments may further use a trusted input/output mechanism to receive opt-in approval from the user for pairing creation and pairing key use.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

The following examples pertain to further embodiments. In an embodiment, a system has a security engine including an identity provider logic to generate a first key pair of a key pairing associating a user of the system and a service provider that provides a web service and having a second system coupled to the system via a network, to perform a secure communication with the second system to enable the second system to verify that the identity provider logic is executing in a trusted execution environment, and responsive to the verification, to send a first key of the first key pair to the second system, the first key to enable the second system to verify an assertion communicated by the identity provider logic that the user has been authenticated to the system according to a multi-factor authentication. The system further has at least one sensor to provide sensed information regarding the user to the security engine, and the security engine is to authenticate the user using the sensed information.

In one embodiment, the identity provider logic is to generate the assertion and sign the assertion with a second key of the key pairing, and the service provider is to enable access to the web service via the second system responsive to verification of the signed assertion. In addition, the security engine is to generate a request communicated along a trusted path of the system to confirm that the user seeks to generate the key pairing to associate the user and the service provider. The security engine is to authenticate the user according to the multi-factor authentication before the user seeks to access the web service, in an embodiment.

In an embodiment, the identity provider logic is to receive an authentication request from the second system and generate the assertion responsive to the authentication request. And, the security engine is to receive the sensed information from the at least one sensor corresponding to a presence detection sensor or a user authentication sensor.

In another embodiment, a method includes: receiving an authentication request in an identity provider logic of a security engine of a client system, where the authentication request is received from a service provider having a web service that a user of the client system seeks to access; generating an assertion that the user has been authenticated to the client system via a multi-factor authentication, and signing the assertion with a first key of a key pairing that associates the user and the service provider; and sending the signed assertion to the service provider, where the service provider is to enable the user to access to the web service responsive to verification of the signed assertion and without a challenge-response interaction with the user.

In an embodiment, the method further includes authenticating the user according to the multi-factor authentication before the user seeks to access the web service. The authentication request may be received in a browser application of the client system, which redirects the authentication request to the security engine.

The method may further include confirming that the user seeks to access the web service via user input, responsive to a request communicated via a trusted path of the client system, where this trusted path is not accessible to malware executing on the client system.

The method may further include generating a first key pair in the security engine responsive to user approval for creating the key pairing. This may include communicating, via a Sigma session between the client system and the service provider, to verify a trusted execution environment of the client system and to provide a public key of the first key pair and to receive a public key of a second key pair generated by the service provider.

In an embodiment, a data structure may be stored in the client system, where the data structure includes a private key and the public key of the first key pair and the public key of the second key pair. This data structure may be accessed to sign the assertion.

Using a method as described, the user is enabled access to the web service without receipt of a username or password from the user. In addition, a user account for the web service may be migrated from a username and password mechanism to association via the key pairing.

A still further embodiment includes at least one computer-readable medium including instructions that when executed enable a system to: receive, in the system of a service provider, a user request to access an account via a website of the service provider without a username or password; send an authorization request from the system to a client system of the user to obtain an assertion that the user has been authenticated to the client system via a multi-factor authentication, where the assertion is signed with a first key of a key pairing that associates the user and the service provider; receive the assertion from the client system; and verify the assertion and grant access to the account via the website responsive to the verification.

In an embodiment, further instructions enable the system to communicate with the client system via a Sigma session to verify a trusted execution environment of the client system and to receive a second key of the key pairing. Additional instructions enable the system to perform a communication between the system and a remote online certificate status provider to obtain certificate information to provide to the client system. Still further instructions enable the system to migrate association of the account via a username and password mechanism to association via the key pairing.

Embodiments may be implemented in code and may be stored on a non-transitory storage medium having stored thereon instructions; which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
  a security engine including an identity provider logic to generate a first key pair of a key pairing associating a user of the system and a service provider that provides a web service and having a second system coupled to the system via a network, to perform a secure communication with the second system to enable the second system to verify that the identity provider logic is executing in a trusted execution environment of the system, and responsive to the verification, to send a first key of the first key pair to the second system, the first key of the first key pair to enable the second system to verify an assertion communicated by the identity provider logic that the user has been authenticated to the system according to a multi-factor authentication, the key pairing further including a second key pair, wherein the service provider is to generate the second key pair; and at least one sensor to provide sensed information regarding the user to the security engine, wherein the security engine is to authenticate the user using the sensed information.

2. The system of claim 1, wherein the identity provider logic is to generate the assertion and sign the assertion with a second key of the first key pair, wherein the service provider is to enable access to the web service via the second system responsive to verification of the signed assertion.

3. The system of claim 2, wherein the security engine is to generate a request communicated along a trusted path of the system to confirm that the user seeks to generate the key pairing to associate the user and the service provider.

4. The system of claim 2, wherein the security engine is to authenticate the user according to the multi-factor authentication before the user seeks to access the web service.

5. The system of claim 1, wherein the identity provider logic is to receive an authentication request from the second system and generate the assertion responsive to the authentication request.

6. The system of claim 1, wherein the security engine is to receive the sensed information from the at least one sensor corresponding to a presence detection sensor or a user authentication sensor.

7. A method comprising:
receiving an authentication request in an identity provider logic of a security engine of a client system, the authentication request received from a service provider having a web service that a user of the client system seeks to access;

generating an assertion that the user has been authenticated to the client system via a multi-factor authentication, and signing the assertion with a first key of a key pairing that associates the user and the service provider, wherein the key pairing includes a first key pair to be generated by the security engine and a second key pair to be generated by the service provider; and sending the signed assertion to the service provider, wherein the service provider is to enable the user to access the web service responsive to verification of the signed assertion and without a challenge-response interaction with the user.

8. The method of claim 7, further comprising authenticating the user according to the multi-factor authentication before the user seeks to access the web service.

9. The method of claim 7, further comprising receiving the authentication request in a browser application of the client system and redirecting the authentication request to the security engine.

10. The method of claim 7, further comprising confirming that the user seeks to access the web service via user input, responsive to a request communicated via a trusted path of the client system, the trusted path not accessible to malware executing on the client system.

11. The method of claim 10, further comprising generating the first key pair in the security engine responsive to user approval for creating the key pairing.

12. The method of claim 11, further comprising communicating, via a Sigma session between the client system and the service provider, to verify a trusted execution environment of the client system and to provide a public key of the first key pair and to receive a public key of the second key pair generated by the service provider.

13. The method of claim 12, further comprising storing a data structure in the client system, the data structure including a private key and the public key of the first key pair and the public key of the second key pair.

14. The method of claim 13, further comprising accessing the data structure to sign the assertion.

15. The method of claim 7, further comprising enabling the user access to the web service without receipt of a username or password from the user.

16. The method of claim 7, further comprising migrating a user account for the web service from a username and password mechanism to association via the key pairing.

17. At least one computer-readable non-transitory medium including instructions that when executed enable a system to:
receive, in the system of a service provider, a user request to access an account via a website of the service provider without a username or password;

send an authorization request from the system to a client system of the user to obtain an assertion that the user has been authenticated to the client system via a multi-factor authentication, wherein the assertion is signed with a first key of a key pairing that associates the user and the service provider, the key pairing including a first key pair and a second key pair, the first key pair including the first key and to be generated in the client system, and the second key pair to be generated in the system of the service provider;

receive the assertion from the client system; and verify the assertion and grant access to the account via the website responsive to the verification.

18. The at least one computer-readable non-transitory medium of claim 17, further comprising instructions that enable the system to communicate with the client system via a Sigma session to verify a trusted execution environment of the client system and to receive a second key of the first key pair of the key pairing.

19. The at least one computer-readable non-transitory medium of claim 17, further comprising instructions that enable the system to perform a communication between the system and a remote online certificate status provider to obtain certificate information to provide to the client system.

20. The at least one computer-readable non-transitory medium of claim 17, further comprising instructions that enable the system to migrate association of the account via a username and password mechanism to association via the key pairing.

* * * * *